10# UNITED STATES PATENT OFFICE.

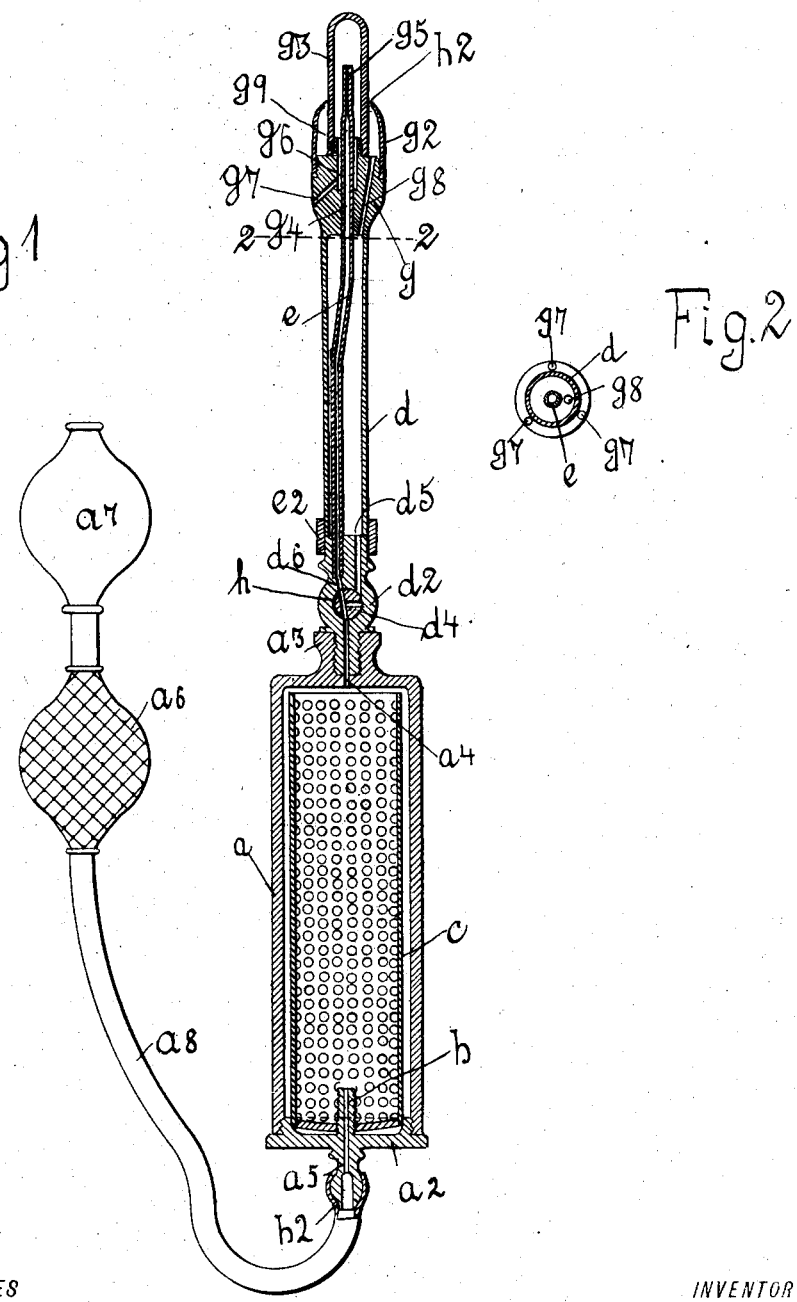

LOUIS WIRSCHING, OF NEW YORK, N. Y.

THERMOCAUTER.

SPECIFICATION forming part of Letters Patent No. 706,482, dated August 5, 1902.

Application filed February 14, 1902. Serial No. 94,028. (No model.)

*To all whom it may concern:*

Be it known that I, LOUIS WIRSCHING, a citizen of the United States, residing at New York, in the county of New York and State of New York, have invented certain new and useful Improvements in Thermocauters, of which the following is a full and complete specification, such as will enable those skilled in the art to which it appertains to make and use the same.

The object of this invention is to provide an improved thermocauter which is simple in construction and operation and which may be easily and conveniently manipulated when used and which will not get out of order or frequently need repair.

The invention is also an improvement on that described and claimed in United States Letters Patent granted to me October 29, 1895, No. 548,689, and is fully disclosed in the following specification, of which the accompanying drawings form a part, in which the separate parts of my improvement are designated by the same reference characters in each of the views, and in which—

Figure 1 is a longitudinal section of my improved thermocauter, and Fig. 2 a section on the line 2 2 of Fig. 1.

In the practice of my invention I provide an air-carbureter which comprises a cylindrical casing $a$, which is adapted to serve as a handle for the device and which is provided at one end with a removable cap $a^2$ and at the opposite end with a tubular extension $a^3$, which is screw-threaded interiorly and provided with a port or passage $a^4$. The cap $a^2$ is provided with a central tubular coupling $a^5$, with which is connected an air-pump or forcing device $a^6$ and $a^7$, the same as in the patent herein referred to, this connection being made by means of a flexible tube $a^8$, and said cap $a^2$ is also provided in the inner side with a screw-threaded tubular coupling $b$, which corresponds with the coupling $a^5$, and a central bore $b^2$ extends through both of said couplings. I also preferably employ a tubular perforated casing $c$, which is screwed onto the coupling $b$ and the end of which opposite the cap $a^2$ is open, and in practice this perforated casing $c$ is filled with suitable carbureting material, as in the patent referred to, said carbureting material being not shown in this case.

The tubular extension $a^3$ at one end of the casing $a$ forms a coupling for a tubular arm $d$, and this connection may be made in any desired manner; but in practice I employ for this purpose a valve-casing $d^2$, in which is placed a three-way valve $d^4$, and one end of the valve-casing $d^2$ is in communication with the port or passage $a^4$ and the other end thereof is provided with two ports or passages $d^5$ and $d^6$, and within the tubular arm $d$ is a small tube $e$, which is in communication with the port or passage $d^6$.

The tubular arm $d$ may be connected with the valve-casing $d^2$ by a sleeve $e^2$ or in any desired manner, and the end of said tubular arm $d$ opposite the valve-casing $d^2$ is provided with an enlarged cauter-head $g$, which may be made integrally therewith or which may be connected therewith in any desired manner. Connected with the outer end of the head $g$ is a conical casing $g^2$, and secured to said head within said casing $g^2$ is a tube $g^3$, which projects a predetermined distance through the conical casing $g^2$, and said head is also provided centrally with a bore or passage $g^4$, which extends longitudinally therethrough and with which the pipe $e$ in the tubular arm $d$ communicates, and said pipe $e$ may be continued through the head $g$, as shown, and said pipe is also in communication with an interior burner-tube $g^5$, which projects a predetermined distance into the tube $g^3$. Around the inner end of the burner-tube $g^5$ is an annular space or chamber $g^6$, which is provided with a port or passage $g^7$, and formed in the head $g$ is a port or passage $g^8$, which forms a communication between the annular chamber $g^9$ within the conical casing $g^2$ and the space within the tubular arm $d$.

In the operation of the device the air which passes through the casing $a$ or perforated casing $c$ is carbureted by the carbureting material, which in practice is placed in said casing $c$, and by means of the valve $d^4$ the gas may be allowed to pass into the tube or arm $d$ or into the tube $e$ within said tubular arm, and the gas which passes into the tubular arm $d$ passes therefrom into the space $g^9$ within the conical casing $g^2$ and is ignited and burns around the inner end of the tube $g^3$, while the gas that passes through the inner tube $e$ passes out through the burner-tube $g^5$ into the interior of the tube $g^3$ and is burned in said tube $g^3$, and the escaping gases of combustion pass out through the port or passage $g^7$.

In Fig. 2 I have shown three of the ports or passages $g^7$ and one port or passage $g^8$, but any desired number of these ports or passages may be employed.

The tube $g^3$ and the tube $g^5$ are preferably made of platinum, this being the best known material for this purpose, but the construction of these tubes is not absolutely limited to the use of this material.

The carbureting material placed in the casing $a$ or in the tubular casing $c$ within the casing $a$ may consist of sponges saturated with petroleum, benzin, or any other suitable material, and the air is forced therethrough by means of the air-pump or forcing devices $a^6$ and $a^7$. The burning of the gases from the chamber $g^9$ and within the tube $g^3$ highly heats the said tube, and by means of the valve $d^4$ the flow of gas may be controlled, so as to pass it through the tubular arm $d$ and through the tube $e$ within said arm, and said valve is also provided with a small groove $h$ in one side thereof, and said valve $d^4$ may be manipulated so as to pass a small amount of gas through both the arm $d$ and the tube $e$, and the gas may be burned both in the annular chamber $g^9$, within the conical casing $g^2$, and within the tube $g^3$, and said tube $g^3$, as will be understood, constitutes the cauterizer proper.

At the end of the conical casing $g^2$ is a small annular space $h^2$, and the initial ignition or burning of the gas takes place at this space, which constitutes the discharge-nozzle of the conical casing $g^2$, and the gas may be ignited at this point, as will be readily understood, while the ignition of the gas which escapes from the tube $g^5$ within the tube $g^3$ is occasioned by the heat from said tube $g^3$, and in practice the tube $g^3$ is first highly heated by means of the gas which escapes from the conical casing $g^2$, after which the carbureted air is directed through the tube $e$ and into the tube $g^3$, where it burns within said tube, and thus maintains said tube at the degree of heat necessary in the act of cauterization.

Having fully described my invention, what I claim as new, and desire to secure by Letters Patent, is—

1. In a thermocauter, a carbureter, an air-forcing device connected with one end thereof, a tubular arm connected with the opposite end thereof, a small tube placed within said tubular arm, a cauter-head connected with the end of said arm and provided with a cauter-tube, a conical casing connected with said cauter-head and inclosing the base of said cauter-tube, a burner-tube secured in said head and projecting into the cauter-tube, the space within said conical casing being in communication with the interior of said arm and the inner burner-tube being in communication with the small tube within said arm, said cauter-head being also provided with an annular space or chamber around the inner end of said burner-tube and with ports or passages communicating therewith and opening outwardly through said head, substantially as shown and described.

2. In a thermocauter, a carbureter, an air-forcing device connected with one end thereof, a tubular arm connected with the opposite end thereof, a small tube placed within said tubular arm, a cauter-head connected with the end of said arm and provided with a cauter-tube secured in said head and projecting into the cauter-tube, the space within said conical casing being in communication with the interior of said arm and the inner burner-tube being in communication with the small tube within said arm, said cauter-head being also provided with an annular space or chamber around the inner end of said burner-tube and with ports or passages communicating therewith and opening outwardly through said head and means for controlling the flow of carbureted air through said tubular arm, and the small tube within said arm, substantially as shown and described.

In testimony that I claim the foregoing as my invention I have signed my name, in presence of the subscribing witnesses, this 12th day of February, 1902.

LOUIS WIRSCHING.

Witnesses:
   F. A. STEWART,
   C. E. MULREANY.